United States Patent [19]

Borras et al.

[11] Patent Number: 4,716,407
[45] Date of Patent: Dec. 29, 1987

[54] TRUNKED COMMUNICATION SYSTEM TRUE PRIORITY CHANNEL SCAN

[76] Inventors: Jaime Andres Borras, Hialeah, Fla.; Michael D. Sasuta, Palatine, Ill.

[73] Assignee: Motorola, Inc., Schaumburg, Ill.

[21] Appl. No.: 945,210

[22] Filed: Dec. 19, 1986

Related U.S. Application Data

[63] Continuation-in-part of Ser. No. 785,173, Oct. 7, 1985, abandoned.

[51] Int. Cl.⁴ .................. H01H 67/00; H04B 11/32; H04B 7/00
[52] U.S. Cl. .................... 340/825.04; 340/825.44; 340/825.5; 340/825.51; 455/166; 455/32; 455/54; 379/58; 379/63
[58] Field of Search .......... 340/825.5, 825.51, 825.03, 340/825.04, 825.44; 379/58, 63; 455/17, 32, 38, 54, 56, 151, 166; 370/110.1, 110.4

[56] References Cited

U.S. PATENT DOCUMENTS

| | | |
|---|---|---|
| 3,497,813 | 2/1970 | Gallagher |
| 3,614,621 | 10/1971 | Chapman et al. .................. 455/166 |
| 3,619,788 | 11/1971 | Giles, Jr. ........................ 455/166 |
| 3,623,106 | 11/1971 | Zerega, Jr. ...................... 455/166 |
| 3,823,375 | 7/1974 | Wycoff .......................... 340/825.5 |
| 3,870,828 | 3/1975 | Saliga |
| 3,990,046 | 11/1976 | Katz et al. ..................... 340/825.04 |
| 4,387,460 | 6/1983 | Boutmy et al. .................. 370/110.4 |
| 4,394,776 | 7/1983 | Borras et al. .................... 455/76 |
| 4,425,661 | 1/1984 | Moses et al. |
| 4,476,581 | 10/1984 | Bragas |
| 4,484,355 | 11/1984 | Henke et al. |
| 4,553,262 | 11/1985 | Coe ............................. 455/15 |
| 4,554,677 | 11/1985 | Smith et al. .................... 455/17 |
| 4,573,207 | 2/1986 | Smith et al. .................... 455/17 |
| 4,573,210 | 2/1986 | Heck ........................... 455/166 |
| 4,591,851 | 5/1986 | Noble et al. .................... 340/825.44 |
| 4,593,155 | 6/1986 | Hawkins ........................ 340/825.5 |
| 4,597,104 | 6/1986 | Ohki et al. ..................... 455/32 |
| 4,622,695 | 12/1986 | Whiting ........................ 455/58 |
| 4,635,285 | 1/1987 | Coombes ....................... 379/58 |
| 4,649,567 | 3/1987 | Childress ....................... 455/17 |
| 4,679,225 | 7/1987 | Higashiyama .................... 455/32 |

Primary Examiner—Ulysses Weldon
Assistant Examiner—Ralph E. Smith
Attorney, Agent, or Firm—Thomas G. Berry

[57] ABSTRACT

While receiving a lower priority message, a remote transceiver unit in a trunked radio communication system is diverted immediately to a priority channel when a priority message is generated. In a first embodiment, a low speed, sub-audible sync word, transmitted by a system controller, causes the remote transceiver to momentarily interrupt the current message and receive priority data transmitted by the system controller. If the priority level of the priority messages exceeds that of the current message, it immediately switches to the priority channel. If not, the remote transceiver reverts to its normal receiving mode and continues its original communication. In a second embodiment, the priority data is transmitted entirely sub-sudible so as to not interrupt the current message. Lastly, in a more basic embodiment, a sub-audible word is transmitted to the remote units causing them to revert to the control channel to receive the priority call assignment. Multi-level message priority is also provided by transmitting sequential priority data words which identify calls of varying priority. The remote units may then respond to the highest priority call.

35 Claims, 4 Drawing Figures

TRUNKED COMMUNICATION SYSTEM TRUE PRIORITY CHANNEL SCAN

This is a continuation of application Ser. No. 785,173, filed Oct. 7, 1985, now abandoned.

BACKGROUND OF THE INVENTION

This invention relates generally to the field of communication systems and more particularly to trunked radio frequency communication systems with priority channel scan.

In a communication system, messages are often classified as priority or non-priority according to the relative importance of the content of the messages or the relative importance of the person(s) originating the messages. When remote transceiver units are communicating non-priority messages, it is desirable to interrupt this communication when a priority message is generated and to switch immediately to a priority channel where the priority message can be received.

In conventional non-trunked communication systems, "priority scan" is accomplished by the use of a dedicated priority channel. Remote units periodically sample the priority channel for activity, even while they are communicating on a non-priority channel. When activity is sensed on the priority channel, the remote units switch to the priority channel and remain there for the duration of the priority message.

There are several disadvantages with a dedicated priority channel communication system. First, a dedicated priority channel is an inefficient use of the radio frequency spectrum because the priority channel is idle most of the time. Second, when several different groups are using the same system, a priority transmission by one group ties up the priority channel, thereby preventing other groups from transmitting priority messages.

In a trunked system, the remote units typically comprise mobile units, portable units or control stations. Generally, a mobile unit is a transceiving device designed to be installed in vehicles. A portable device is typically understood to be a transceiving device designed to be carried on or about the person. A control station is typically a permanent or semipermanent installation in a building or other fixed location. As used herein, all of these remote transceiving devices are collectively referred to as subscriber units.

Generally, it is known for a subscriber unit participating in a voice conversation to transmit a sub-audible connect tone to the central station (or system controller). The central station, in turn, transmit a digital connect word commonly referred to as the low speed handshake (LSH). Failure of the central station to receive the inbound connect tone will cause the central to reassign the channel to another requesting subscriber or to the pool of available frequencies. Failure of the subscribers to receive the LSH from the central causes them to return to the control channel to await a new channel grant or to request a communication channel.

In prior trunked communication systems, a subscriber unit requests a user channel assignment by transmitting the request to a system controller on an inbound control channel. The controller responds by transmitting a code containing a user channel assignment on an outbound control channel. In addition to the user channel assignment, the code also specifies which group of subscriber units should move to the newly assigned user channel. All subscribers monitoring the control channel and within the specified group then switch over to the newly assigned user channel.

The disadvantage of such a trunked communication system is that once the subscribers switch to an assigned user channel, they can no longer monitor the control channel and consequently will miss commands from the system controller to switch to a priority channel. Subscribers operating on an assigned user channel must wait until the non-priority message is completed before returning to the control channel to receive further channel assignments. Depending on the duration of the non-priority message, the subscribers have usually missed the entire priority message by the time they return to the control channel.

SUMMARY OF THE INVENTION

It is an object of the invention to provide an improved trunked communication system.

It is another object of the invention to provide a communication system that conserves frequency spectrum and maximizes available channel usage.

It is a further object of the invention to provide a priority message feature for a trunked communication system that does not use a dedicated priority channel.

It is yet another object of the invention to provide a priority message feature for a communication system that permits more than one priority message to be transmitted to different user groups at the same time.

It is yet a further object of the invention to provide a communication system whereby remote units can receive commands while communicating messages, and wherein the commands do not significantly degrade the content of the messages.

It is still another object of the invention to provide a true priority message feature for a trunked communication system whereby selected remote units can be directed to a priority channel even while those remote units are communicating non-priority messages.

Briefly, one embodiment of the invention includes a system controller for use with a subscriber unit wherein the subscriber has means for transmitting a request and means for transmitting an acknowledgment. This embodiment includes user channel transmitting means for transmitting a carrier on at least one user channel. Intelligence modulating means for modulating the user channel with intelligence is included wherein the intelligence occupies a first frequency band, in which the LSH signal is ordinarily transmitted. Means for modulating the user channel with a low speed sync word is included. The low speed sync word is finite in duration and occupies a second frequency band. Interrupting means is included for momentarily interrupting the intelligence modulation. The interruption occurs substantially at the termination of the low speed sync word. High speed code modulating means is also included for modulating the user channel with a high speed code of finite duration. The high speed code is sent during the momentary interruption.

Another aspect of the present invention includes a remote unit for use with a system controller wherein the system controller has means for transmitting intelligence, means for transmitting a low speed sync word, means for transmitting a high speed code having first and second portions, means for transmitting an end of message code, and means for transmitting a hand shake. This embodiment includes communicating means for communicating on first and second channels. Normal mode detecting means for detecting the intelligence and the low speed sync word transmissions is connected to the communicating means. High speed mode detecting means for detecting the high speed code, the end of message code, and the hand shake transmission is connected to the communicating means. Means are included for switching from the normal mode to the high speed mode when the low speed sync word is detected. A code table with at least one entry along with means for comparing the first portion of the high speed code with the code table entry are included. Also included is a means for switching from the first to the second channel when the first portion of the high speed code corresponds to the code table entry.

Still another aspect of the present invention includes a communications method wherein intelligence and a finite duration low speed sync word are transmitted on a first channel. The intelligence transmission is interrupted substantially at the completion of the low speed sync word. Next, a high speed code having first and second portions is transmitted on the first channel. The first portion of the high speed code is then compared to a table having at least one entry. When the first portion of the high speed code corresponds to the table entry, the frequency of a remote unit is then changed from the first channel to a second channel.

Alternately, according to another embodiment of the present invention, the LSH signals transmitted by the central are interleaved with priority call information. The subscriber units receive the sub-audible LSH and priority information, without interrupting the current non-priority call, and determine whether to continue with the existing call or abandon the call and respond to the priority message. The interleaved priority signals may be identical if there is only one priority message, or they may be different priority messages, of varying degrees of priority, from which the subscriber selects the highest priority message. In this way, priority information may be communicated to the subscriber units in a sub-audible fashion that does not interrupt an existing call in the absence of a priority message for that particular subscriber.

Finally, in a more basic embodiment of the present invention, a predetermined sub-audible word is transmitted to the subscribers on the user channels. Upon detection of the word, the subscribers abandon the current call and return to the control channel to receive both priority and non-priority call assignments. The subscribers may then respond to the highest priority call currently in progress.

DESCRIPTION OF THE PREFERRED EMBODIMENTS

Preferably, the present invention operates within a trunked radio communication system, wherein there is at least one control channel and two or more user channels. Each channel comprises a pair of frequencies, an inbound and an outbound, where inbound messages are transmitted to a system controller and outbound messages are transmitted by the system controller. The system controller regulates the use of the user channels by receiving channel assignment requests from the various subscribers on the inbound control channel, and transmitting a code containing the channel assignment on the outbound control channel.

Messages communicated over the system are classified as priority or non-priority. In one embodiment, message classification is by rank. For example, every time a supervisor transmits a message, a priority message would be generated causing all the subscriber units operated by the subordinate employees to switch immediately to a priority channel. Preferably, priority channels are standard user channels that are temporarily carrying a priority message, but separate user and priority channels are possible, although less desirable.

Typically, the subscriber units are assigned to various groups, called fleets, which can be further subdivided into sub-fleets. Each subscriber has a unique address, stored in an internal memory, which consists of the unit's fleet, sub-fleet, and an individual I.D. As will be explained in greater detail below, the subscriber's address is transmitted along with its channel request. The system controller then transmits a code, which not only contains the channel assignment but also the address of the originating unit. Other subscribers receiving this code may then compare the received address to the entries in a priority message table stored in memory. These entries are the addresses of other subscribers units that have been listed as having priority over non-priority messages. If a subscriber unit is receiving a non-priority message, but it finds a match between the received address and one of the entries in the priority message table, it immediately switches to the priority channel specified in the received code.

AUDIBLE SIGNALLING

Figure 1A:
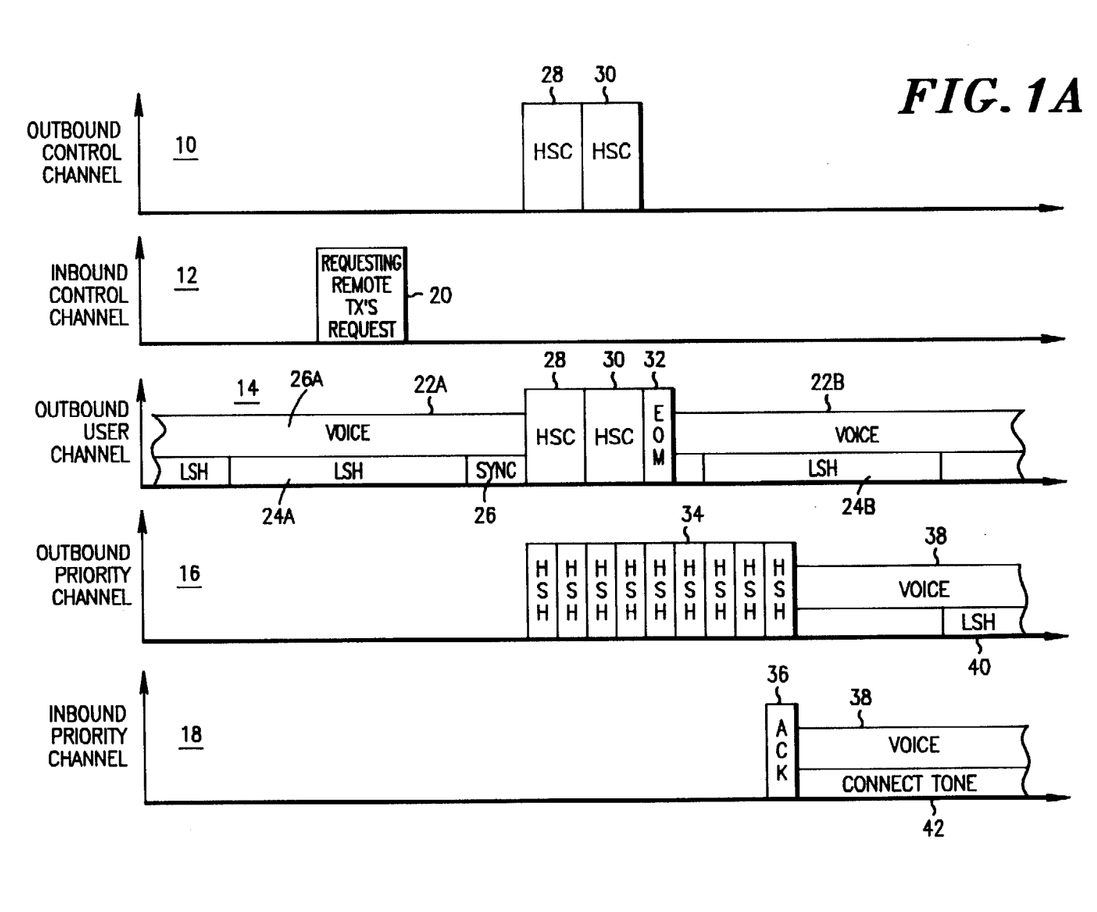
FIG. 1a is a diagram illustrating an exemplary sequence of events that occurs, respectively from top to bottom, on the outbound control channel, the inbound control channel, the user channels, the outbound priority channel, and the inbound priority channel, to implement a priority message transmission in accordance with a first embodiment of the present invention.

Referring now to FIG. 1a there is shown an exemplary sequence of events that may cause a subscriber unit, receiving a non-priority message, to switch to a priority channel. The five channels that are illustrated are: an outbound control channel 10, an inbound control channel 12, an outbound user channel 14, an outbound priority channel 16, and an inbound priority channel 18. The outbound and inbound priority channels are actually standard user channels that are temporarily carrying a priority message.

To begin the sequence, a requesting subscriber unit transmits a request 20 on inbound control channel 12. Request 20 is preferably transmitted at 3600 baud, although other baud rates compatible with the channel bandwidth are suitable. Request 20 contains the address of the requesting unit and several status bits to indicate to the system controller that the remote unit is requesting the use of a user channel. Although only one request 20 is shown in FIG. 1a, it is to be understood that other subscribers may also use the inbound control channel to transmit additional requests.

Prior to and during the transmission of request 20, a message 22a is being transmitted on outbound user channel 14. Message 22a is also being transmitted by a subscriber unit on the corresponding inbound user channel (not illustrated). The system controller operates to repeat the received voice message on the outbound user channel. This message 22a consists of a substantially continuous series of low speed handshakes (LSH) 24 and voice modulation 26. LSH 24 occupies a first frequency band and is preferably transmitted at 150 baud. The first frequency band is preferably sub-audible and extends from DC to about 75 Hz. Voice modulation 26 occupies a second frequency band preferably extending from just above the 75 Hz upper limit of the first frequency band to about 3 kHz. Although it is preferred that the first frequency band be positioned below the second frequency band, it may also be positioned above, as by subcarrier modulation. Also, this embodiment is not limited to voice transmission, as any form of intelligence can be transmitted in the second frequency band.

After request 20 is transmitted, and at the completion of LSH 24, a low speed sync word 26 is transmitted in the first frequency band on all active outbound user channels 14. Sync word 26 alerts the subscriber units that a burst of high speed data is about to be transmitted and causes these subscribers to switch their receiver modes from a normal mode to a high speed data mode. Sync word 26 is of finite duration, preferably about 53 msec long.

At the completion of sync word 26, message 22a is interrupted and high speed codes ("HSC") 28 and 30 are transmitted on all active outbound user channels 14. A portion of each HSC 28 and 30, referred to as channel assignment bits, contains information directing certain subscriber units to a particular priority channel. An address portion of each HSC 28 and 30 indicates the address of the requesting subscriber unit. Upon receipt of HSC 28, the remote units compare the address portion to a priority message table stored in their respective internal memories. If the received address matches an entry in the priority message table, the remote unit switches, preferably immediately, to the priority channel specified by the channel assignment bits. This process is repeated for the second HSC 30. Although two HSC's 28 and 30 are shown in FIG. 1, the transmission of one, three or more HSC's is also possible. Each HSC 28 and 30 is of finite duration, preferably about 23 msec long. The baud rate for HSC's 28 and 30 is preferably 3600 baud.

The system can be provided with multi-level priority by transmitting the HSC command for a high priority message first (HSC 28) and the HSC command for a low priority message second (HSC 30). This technique is not limited to two levels of priority, but can be extended to three or more priority levels simply by transmitting more contiguous HSC's. If a subscriber unit is receiving a low priority message, it can be diverted to a new priority channel, before the low priority message is completed, if the system controller transmits the HSC command in the first position (HSC 28). If the system controller transmits the HSC command in the second position, the subscriber unit waits until the original low priority message is completed and then switches to the second low priority channel, specified by HSC 30. If no high priority command is available when a low priority command needs to be transmitted, the first (high priority) HSC 28 can be a "dummy" code while the second (low priority) HSC 30 transmits the low priority command.

At the completion of the last HSC, an end of message (EOM) code 32 is optionally transmitted on all active outbound user channels 14. EOM code 32 is of finite duration and is preferably about 5 msec long. EOM code 32 is preferably transmitted at 3600 baud and is preferably a "101010" bit pattern. If some subscriber units have not found a match between the address portions of HSC's 28 and 30 and their respective priority message tables, upon receipt of EOM code 32 these subscribers revert back to the normal mode and continue to receive message 22b.

This sequence of transmitting low speed sync word 26, high speed codes 28 and 30, and end of message code 32 can and should be repeated, but preferably not before at least four more low speed handshakes 24b have been transmitted. If this sequence is transmitted more often than every fifth low speed handshake, an unacceptable degradation of voice modulation 26 may result. If three HSC's are transmitted, preferably they should not be repeated until at least six more low speed handshakes have been transmitted. This assures that the audio interruption time is about ten percent or less of the overall repetition period, thereby assuring that the voice 26 is unobjectionable. Repeating this sequence is necessary because the subscriber unit originating voice modulating 26 on the inbound control channel is in the transmit mode and is unable to receive anything until it completes its transmission and reverts to the receive mode.

Upon completion of a communication on a user channel, the subscriber units revert back to monitoring the outbound control channel 10. Therefore, HSC's 28 and 30 are also transmitted simultaneously on outbound control channel 10 to direct any idle subscriber units to the priority channel. Although only HSC's 28 and 30 are illustrated in FIG. 1a, it is to be understood that other codes are being transmitted on the outbound control channel before and after the transmission of HSC's 28 and 30.

During, or at the completion of HSC 28, the system controller transmits a series of high speed handshakes (HSH) 34, on outbound priority channel 16. Each handshake of series 34 is preferably 21 bits long and transmitted at 3600 baud. Although 9 handshakes are shown in HSH series 34, the number can be anything because the handshakes continue until the requesting remote unit transmits acknowledge tone 36 on inbound priority channel 18.

Acknowledge tone 36 is preferably 1800 Hz, although any predetermined code, analog or digital, would be suitable. Each high speed handshake of handshake series 34 includes address information almost identical to that of high speed codes 28 and 30. Thus, when a subscriber unit switches to the new priority channel, if the address information contained in handshake series 34 does not match up with an address stored in the table in the subscriber's internal memory, the subscriber knows that it has not switched to the proper channel and it can revert back to the channel it was previously operating on. Also, the requesting subscriber unit cannot transmit on the new priority channel until it receives a proper handshake.

Once the handshake has been completed, the requesting subscriber transmits voice modulation 38 on inbound priority channel 18. The system controller retransmits voice modulation 38 on outbound priority channel 16, adding low speed handshake 40. The requesting subscriber unit transmits sub-audible connect tone 42 in response to LSH 40.

Although this embodiment of the invention directs remote units to priority channels, the information contained in HSC's 28 and 30 is not limited to priority channel information, but could contain any information compatible with the baud rate and time constraints of HSC's 28 and 30.

SUB-AUDIBLE SIGNALLING

From the foregoing, it should be apparent that all the user channels are interrupted to disseminate the priority call information. Of course, those subscribers that respond to the priority call will necessarily be interrupted, however, the remaining non-responding subscribers are also interrupted, although briefly. The present invention contemplates that, to some subscribers, any interruption may be intolerable. Accordingly, in another embodiment, the priority information is communicated entirely sub-audible to the subscribers by interleaving the priority information with the LSH, which is ordinarily sent sub-audible. In this way, priority message information is provided to the subscribers without interrupting the non-responding subscribers.

Figure 1B:
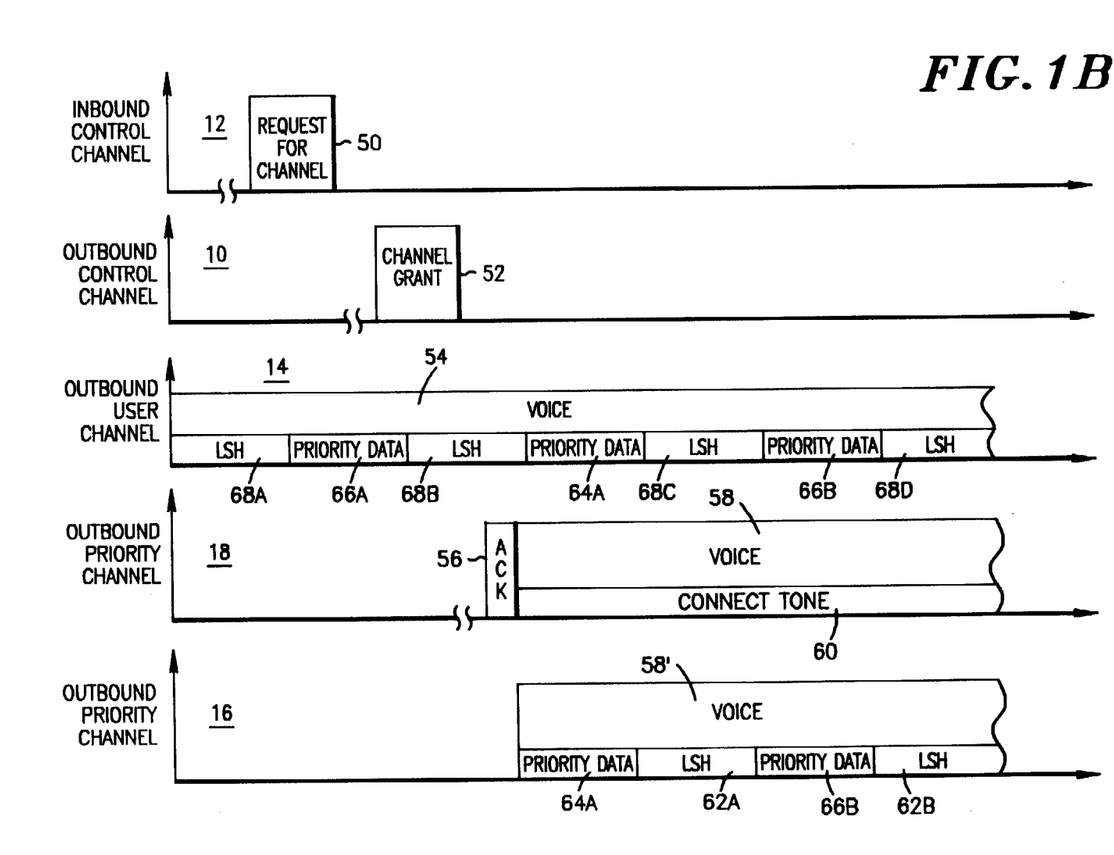
FIG. 1b is a diagram illustrating a exemplary sequence of events that occurs, respectively from top to bottom, on the inbound control channel, the outbound control channel, the user channels, the inbound priority channel, and the outbound priority channel, to implement a priority message transmission in accordance with another embodiment of the present invention.

Referring now to FIG. 1b, there is shown an exemplary sequence of events that may cause a subscriber unit, currently receiving a nonpriority message, to abandon the nonpriority message and switch to a priority channel. The five channels illustrated are: an outbound control channel 10, an inbound control channel 12, outbound user channels 14, an outbound priority channel 16 and an inbound priority channel 18. Although the channel pair 18 and 16 are designated as a priority channel pair, it will be understood that this channel is a conventional channel currently carrying a priority message. The sequence begins, with a subscriber unit transmitting a request 50 on the inbound control channel 12 to the system controller. The request 50 contains the requesting subscriber's ID code and various status bits that may indicate the current status of the subscriber, or may be decoded to determine whether the subscriber is requesting a priority or emergency channel. The systems controller decodes the request and, if a channel is available, transmits a channel grant 52 on the outbound control channel. The channel grant 52 causes the requesting subscriber to go to the assigned inbound priority channel 18 and begin transmitting and causes any idle subscribers having a corresponding group or subgroup ID to move to the outbound priority channel 16 as listening units. The requesting subscriber acknowledges (56) the channel grant and begins transmitting a voice message 58 together with a connect tone 60 on the inbound priority channel 18. The system controller repeats the voice message 58' on the outbound priority channel 16 together with a low speed handshake 62 interleaved with priority data 64. As previously mentioned, any subscriber currently handling a call would not be monitoring the outbound control channel 10 and therefore would not have responded to the channel grant 52. Therefore, one or more subscribers may fail to respond to the priority message. Accordingly, the present invention contemplates interleaving a priority data message in the low speed handshake portion of the outbound user channels 14. Additionally, since the priority channel (16 and 18) is, in fact, a user channel, priority information is also interleaved with the LSH for that channel.

As an example, and not as a limitation, the outbound user channel 14 is illustrated having a voice message 54 in progress. Transmitted sub-audibly, is a low speed handshake 68 interleaved with priority data 66 and 64. The priority data 66 and 64 may be identical if there is only one priority message in progress. Assuming two priority messages are in progress, data information 64 and 66 would, of course, be different and may be of varying levels of priority. Those skilled in the art will appreciate that the present invention is not limited to only two concurrent priority calls nor any fixed number of priority call levels, but may be any suitable number selected for a particular implementation.

Referring still to the outbound user channel 14, the low speed handshake 68 comprises a predetermined data word that instructs the subscriber units participating in the call to remain monitoring that particular user channel. Following the low speed handshake 68a is a priority data message 66a. The priority data message 66a would be comprised of information such as the identity of a subscriber unit transmitting a priority message. All subscribers currently on a user channel would receive this message sub-audibly and compare this information to the information in the priority table stored in any suitable memory means in the subscribers. If the subscriber recognized the priority data as a priority call that it should respond to, the subscriber unit would abandon the current call and go to the outbound priority channel to receive the priority message. Alternately, if the comparison with the priority table indicated that the priority call is of a lower or equal priority level than the current message, or, that the ID code of the priority called is one which the subscriber should not respond to, the subscriber unit would continue to process the current message 54. The low speed handshake (68b) is repeated following the priority data 66a. The priority data and low speed handshake are interleaved for a suitable duration to allow the subscriber to remain on the assigned voice channel.

Assuming now that a requesting subscriber has just been granted the priority channel (18 and 16), a new priority data signal 64a is interleaved with the low speed handshake 68c and will be alternated with priority data 66b. However, if the new priority message had not appeared, the priority data 66b may have been repeated in this time slot. If the subscriber should respond to the priority call indicated by the data 64a the current call would be abandoned and the subscriber would move to the outbound priority channel 16 to receive the priority voice message 58'. However, if the subscriber identified the priority data 66b as having a higher priority level than the priority information 64a, the subscriber would respond to the highest priority message. Again, low speed handshake 68c follows the priority data 64a, which is interleaved by priority data 66b, which is replicated from the priority data 66a. This process continues for how ever many priority messages are in progress so that subscribers currently processing a call may respond to the highest priority message. In a similar manner, the outbound priority channel 16 has a low speed handshake 62 interleaved with priority data 64 and 66 in the event that yet a higher priority message occurs during the priority message 58. In this manner, priority information is provided sub-audibly to the subscriber units without interrupting the voice message of any call currently in progress.

From the foregoing, it will be apparent to one of ordinary skill in the art that a more basic embodiment of the present invention may be implemented by transmitting a predetermined word, such as either the low speed sync word or any of the priority data words, to the subscribers over the user channels. The subscribers upon detection of this word would abandon the current call and return to the control channel. From the control channel, each subscriber would receive both priority and non-priority call assignment information since all call assignments are repeated while a call in progress. The subscribers may respond to the highest priority call by determining (from a priority call table stored in any suitable storage means) the highest priority call currently in progress. While this embodiment has the advantage of ease of implementation, it is generally not preferred since it requires additional time to change frequencies twice and involves interrupting all of the calls as in the audible signalling embodiment.

Figure 2:
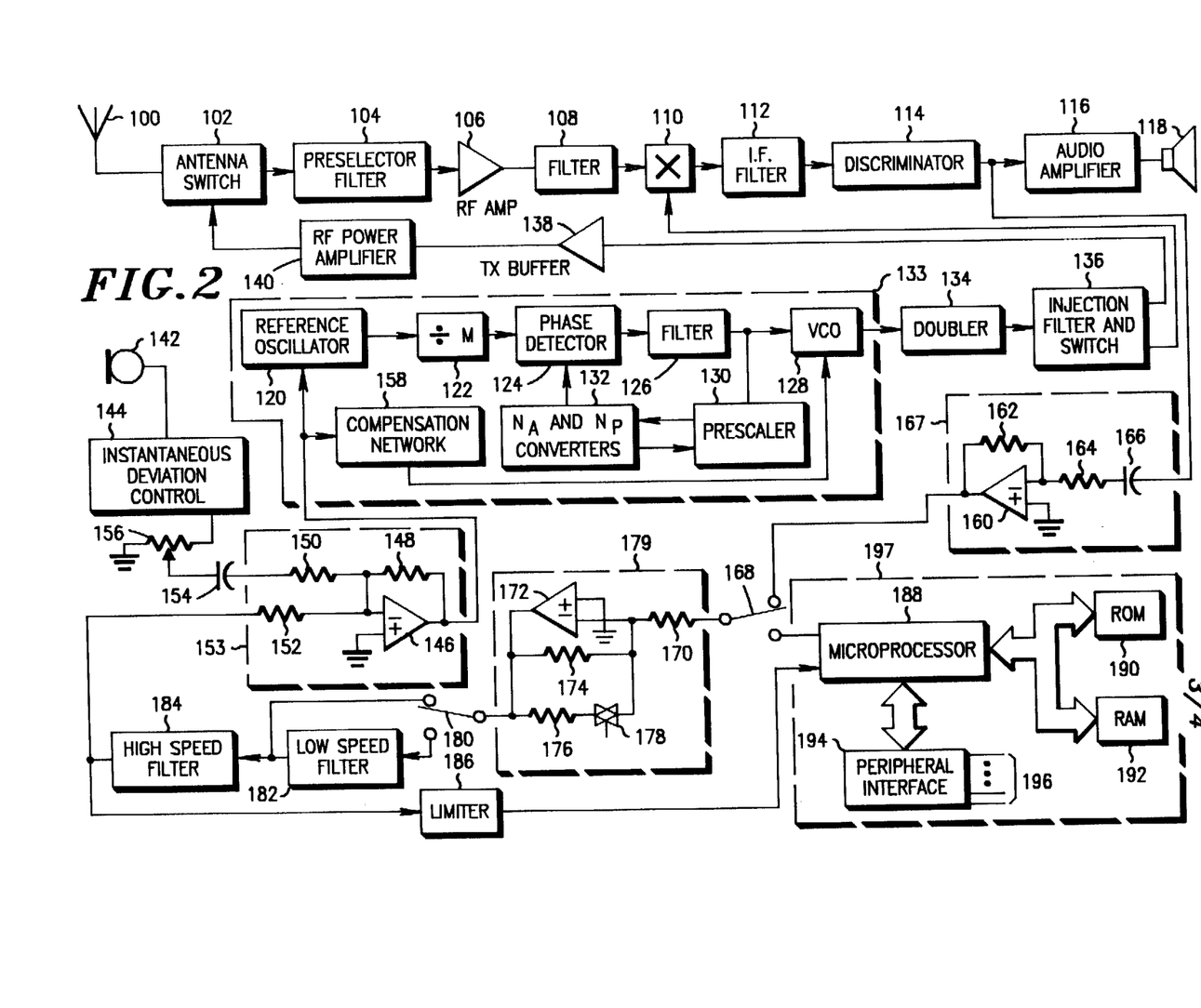
FIG. 2 is a block diagram of a subscriber unit.

Referring to FIG. 2, wherein a block diagram of a typical subscriber unit is illustrated, an antenna 100, an antenna switch 102, a preselector filter 104, an RF amplifier 106, a filter 108, a mixer 110, an IF filter 112, a discriminator 114, an audio amplifier 116, and a speaker 118, are interconnected to form a well known single conversion FM receiver. A reference oscillator 120, a divider 122, a phase detector 124, a low pass filter 126, a voltage controlled oscillator 128, a prescaler 130, and a counter 132 are interconnected to form a well known frequency synthesizer 133. In the preferred embodiment the frequency of reference oscillator 120 is preferably 12.8 MHz. Divider 122 preferably divides 2048 and prescaler 130 divides by 127 or 128, the division being controlled by counter 132. The dividing ratio of counter 132 is under the control of a microprocessor and keyboard (not shown). Filter 126 is preferably a 2 pole low pass filter. Divider 122, phase detector 124, and counter 132 are a commercially available Motorola part number MC145158 integrated circuit.

A frequency doubler 134 is connected between the output of VCO 128 and the input of an injection filter and switch 136. One output of injection filter and switch 136 is connected to one input of mixer 110, while the other output is connected to the input of a transmit buffer 138. An RF power amplifier 140 is connected between the output of transmit buffer 138 and the transmitter input of antenna switch 102.

A microphone 142 is connected to the input of instantaneous deviation control ("IDC") 144. IDC 144 amplifies the signal from microphone 142, limits its voltage swing, and low pass filters the resulting signal to provide splatter protection.

An operational amplifier 146 and three resistors 148, 150, and 152 form a well known linear summing amplifer 153. The output of IDC 144 is connected to one input of summing amplifier 153 through a capacitor 154 and a variable resistor 156. Those skilled in the art will recognize that microphone 142, IDC 144, amplifier 153, frequency synthesizer 133, double 134, injection filter and switch 136, transmit buffer 138, RF power amplifier 140, antenna switch 102, and antenna 100 form a well known synthesized FM transmitter.

An operational amplifier 160, two resistors 162 and 164, and a capacitor 166 are interconnected to form a well known negative gain AC coupled amplifier stage 167 having a preferred gain of −3. The input to amplifier stage 167 at capacitor 166 is connected to the output of discriminator 114. The output of operational amplifier 160 is connected to a first terminal of a single pole two position electronic switch 168. A resistor 170 is connected between the common terminal of switch 168 and the inverting input of an operational amplifier 172. A resistor 174 is connected between the inverting input and the output of operational amplifier 172. Series connected resistor 176 and transmission gate 178 are also connected between the inverting input and the output of operational amplifier 172. The output of operational amplifier 172 is also connected to the common terminal of single pole two position electronic switch 180. Those skilled in the art will recognize that when transmission gate 178 is open, the overall gain of operational amplifier stage 172 is the resistance of resistor 174 divided by the resistance of resistor 170, but when transmission gate 178 is closed, the overall gain of the circuit is reduced to the ratio of the parallel resistance of resistors 174 and 176 divided by the resistance of resistor 170. Thus, the circuit forms a variable gain amplifier stage 179 wherein the gain is controlled by transmission gate 178. Amplifier 179 is normally operated in its high gain mode when used to boost received signals from amplifier 167, and in its low gain mode when connected to the microprocessor through switch 168.

The input to a low speed data filter 182 is connected to the first terminal of electronic switch 180. Filter 182 is preferably a 7 pole Chebeshev filter with a corner frequency of 230 Hz. The output of filter 182 is connected to the input of a high speed data filter 184. Filter 184 is preferably a 7 pole Bessel filter with a corner frequency of 2050 Hz. The input of filter 184 is also connected to the second terminal of switch 180. The output of filter 184 is connected to the second input of linear summing amplifier 153 at resistor 152. A well known limiter circuit 186 is connected between the output of filter 184 and an input port of a microprocessor 188.

Microprocessor 188 is preferably a Motorola MC68HC03 microprocessor, although most microprocessors, well known in the art, are suitable. An output port of microprocessor 188 is connected to the second terminal of switch 168. ROM 190 and RAM 192 memories are connected to microprocessor 188.

A peripheral interface 194 is connected to microprocessor 188. A plurality of ports 196 of peripheral interface 194 control, directly or indirectly, various functions of the invention, e.g., antenna switch 102, squelch circuits in audio amplifier 116, counter 132, injection filter and switch 136, transmit buffer 132, RF power amplifier 140, IDC 144, electronic switch 168, transmission gate 178, and electronic switch 180.

Figure 3:
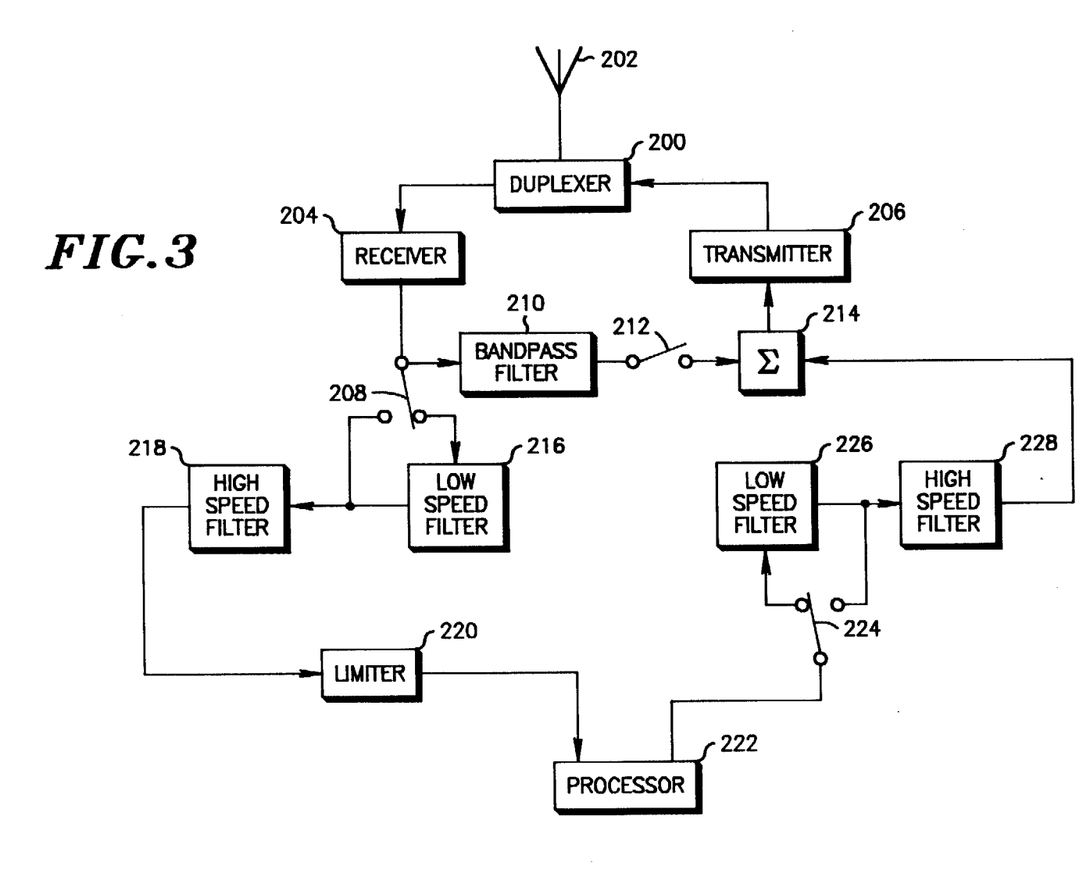
FIG. 3 is a block diagram of a system controller.

Referring to FIG. 3, wherein a partial block diagram of a typical system controller is illustrated, a well known duplexer 200 is connected to an antenna 202, a well known superheterodyne FM receiver 204, and a well known FM transmitter 206. Duplexer 200 permits full duplex operation, i.e. simultaneous receive and transmit on two separate frequencies, of receiver 204 and transmitter 206, through single antenna 202. The frequencies of receiver 204 and transmitter 206 are generated by well known quartz crystal oscillators, commonly referred to as channel elements.

The discriminator output of receiver 204 is connected to the common terminal of a single pole two position electronic switch and to the input of a bandpass filter 210. Bandpass filter 210 is designed to pass voice modulation and to attenuate connect tone modulation (see FIGS. 1a and 1b). The output of bandpass filter 210 is connected to a first terminal of a single pole electronic switch 212. A second terminal of electronic switch 212 is connected to a first input of a summing amplifier 214. The output of summing amplifier 214 is connected to the modulation port of transmitter 206. Summing amplifier 214 is similar in design to summing amplifier 153 of FIG. 2.

A first terminal of electronic switch 208 is connected to the input of low speed filter 216. The output of low speed filter 216 and a second terminal of electronic switch 208 are connected to the input of a high speed filter 218. A well known limiter 220 is connected between the output of high speed filter 218 and a first port of a processor 222. Processor 222 can be any well known microprocessor or general purpose computer, depending upon the number of channels and the number of users in the system.

A second port of processor 222 is connected to the common terminal of a single pole two position electronic switch 224. A first terminal of electronic switch 224 is connected to the input of a low speed filter 226. A second terminal of electronic switch 224 and the output of low speed filter 226 are connected to the input of a high speed filter 228. The output of high speed filter 228 is connected to a second input of summing amplifier 214. Low speed filters 216 and 226 are similar to low speed filter 182 of FIG. 1, and high speed filters 218 and 228 are similar to high speed filter 184 of FIG. 1.

To implement a complete system controller, all the elements in FIG. 3, except processor 222, are duplicated for each channel in the system.

Referring to FIGS. 1a, 1b, 2 and 3, synthesizer 133, doubler 134, injection filter and switch 136, transmit buffer 138, and RF power amplifier 140 provide a means for generating a carrier in the subscriber unit on a control, user, or priority channel. The particular channel selected is controlled by counter 132, which in turn is controlled by microprocessor 188 through peripheral interface 194. Subscriber units use microphone 142, IDC 144, and summing amplifier 153 to provide a means for modulating an inbound carrier with voice (for example reference numeral 38). If another form of intelligence, such as data, is desired to be modulated on the carrier, microphone 142 and IDC 144 can be replaced by a suitable data signal source and appropriate splatter filter. In the system controller, the received voice modulation appears at the discriminator output of receiver 204, then filtered by bandpass filter 210 and used to modulate transmitter 206 through summing amplifier 214.

The low speed handshake, sync words (26) and priority data signals are generated in the system controller by processor 222 and coupled to low speed filter 226 through switch 224. The filtered low speed handshake is coupled into the modulation port of transmitter 206 through high speed data filter 228 and summing amplifier 214.

Channel requests (20 or 50) are generated in the subscribers by processor 197. The request is coupled to high speed data filter 184 through switch 168, amplifier 179, and switch 180. The output of high speed data 184 is coupled to the modulation port of synthesizer 133 through summing amplifier 153. During the transmission of a request, IDC 144 is deactivated.

In the audible signalling embodiment, after receiving the request, the system controller transmits a low speed sync word 26 on all outbound channels. Low speed sync word 26 is generated by processor 222 and is coupled to low speed filter 226 through switch 224. The filtered low speed sync word 26 is coupled to the modulation port of transmitter 206 through high speed data filter 228 and amplifier 214.

After the completion of sync word 26, processor 222 generates high speed codes 28 and 30, and at the same time deactivates voice modulation 26 through switch 212. High speed codes 28 and 30 are coupled to high speed filter 228 through switch 224. The filtered high speed code is coupled to the modulation port of transmitter 206 through the amplifier 214.

Substantially at the termination of high speed code 30, processor 222 generates end of message code 32. End of message code 32 is coupled to the modulation port of transmitter 206 in a similar fashion to high speed codes 28 and 30. Substantially at the termination of end of message code 32, processor 222 reactivates voice modulation 26 and low speed handshake modulation 24.

The subscriber units have two receive modes, a normal mode to detect voice, low speed handshakes, and low speed sync, and a high speed mode to detect high speed handshake. In both modes the output of amplifier 167 is connected through switch 168 to the input of amplifier 179. In the normal mode, the output of amplifier 179 is connected to the input of low speed data filter 182. The output of filter 182 is connected through filter 184 to the input of limiter 186. The output of limiter 186 is connected to an input port of microprocessor 188 through limiter 186.

In the normal mode, processor 197 looks for low speed sync words 26 and upon detecting a sync word, processor 197 switches the remote unit from the normal mode to the high speed mode. In the normal mode, audio amplifier 116 is activated and received voice messages can be heard through speaker 118. When processor 197 switches from the normal mode to the high speed mode, audio amplifier 116 is deactivated, thereby momentarily interrupting the message.

In the high speed mode, processor 197 detects high speed codes, end of message codes, and high speed handshakes. Processor 197 compares the first portion, or address portion, of a received high speed code with a code table stored in the processors memory 190 or 192. If processor 197 finds a match between the address portion of the high speed code and the code table, it causes frequency synthesizer 133 to switch to the channel specified by the second portion, or priority channel portion, of the received high speed code. If processor 197 is unable to match the address portion of the received high speed code with any entry in the code table, processor 197 switches the remote unit from the high speed mode back to the normal mode upon detection of end of message code 32.

If a match between the first portion of the high speed code and the code table is found by processor 197 and the processor has switched synthesizer 133 over to the new priority channel, processor 197 now looks for the high speed handshake 34. High speed handshakes 34 are generated in the system controller by processor 197. The high speed handshake signal is connected to the input of high speed data filter 184 through switch 168, amplifier 179 and switch 180. The filtered high speed handshake is coupled to the modulation input of synthesizer 133 through amplifier 153. In the subscriber unit, the processor 197 detects high speed handshakes (34) and compares the received high speed handshakes with the code table. If processor 197 finds a match between the high speed handshake and the code table, it has confirmed that it has switched to the proper channel. Processor 197, then switches the subscriber unit from the normal mode to the high speed mode. If the high speed handshake does not correspond to the code table entries, the remote unit apparently has inadvertently been sent to the wrong channel and processor 197 then switches synthesizer 133 back to the original channel.

If processor 197 finds a match between high speed handshake and one of the code table entries, the processor generates an acknowledge tone, preferably at 1800Hz. The acknowledged tone is connected to the modulation port of synthesizer 133 through switch 168, amplifier 179, switch 180, high speed data filter 184 and amplifier 153. Processor 222 in the system controller detects acknowledge tone 36 and upon detection terminates the series of high speed handshakes 34. After terminating high speed series 34, the system controller begins transmitting low speed handshakes 40 on the new priority channel.

Immediately after acknowledge 36 is transmitted, the subscriber unit can begin voice message 38. The system controller receives voice message 38 and retransmits it on outbound priority channel 16. The system controller also transmits low speed handshakes 40 on output priority channel 16. Processor 197 in the subscriber unit detects low speed handshake 40 and generates a 105 Hz connect tone 42 although the connect tone can be any sub-audible frequency. Connect tone 42 is connected to the modulation port of synthesizer 133 through switch 168, amplifier 179, switch 180, low speed data filter 182, high speed filter 184 and amplifier 153.

In the sub-audible signalling embodiment, after receiving the request, the processor 222 of the system controller (see FIG. 3) generates and interleaves the priority data with the low speed handshake on the outbound user channels. Both the low speed handshake and the interleaved priority data are coupled to low speed filter 226 through the switch 224. The filtered low speed information is coupled to the modulation port of the transmitter 206 through the high speed data filter 228 and the summing amplifier 214.

The subscriber unit receives the low speed information in the conventional manner, the limited (186) version of which is presented to the processor 188. The processor 188 separates (commonly referred to as "parsing" is digital processing parlance) the low speed handshake from the priority data and peruses its priority data table to determine whether or not to respond to the priority message. Moreover, if a plurality of priority data information has been received, the processor 188 determines which is the highest priority message and responds to that call. In this way, the priority information in provided to the subscribers entirely sub-audible and the current call is not interrupted (i.e., inhibiting the amplifier 116) unless that particular subscriber should respond to a priority message.

While preferred embodiments have been described, it will be understood to those of ordinary skill in the art that many modifications may be made. It is therefore contemplated that covered by the present application any and all such modifications that may fall within the true spirit and scope of the basic underlying principles disclosed and claimed herein.

We claim:

1. In a trunked communication for communicating messages of varying priority levels having at least one central station for allocating a limited number of communication channels among a plurality of subscribers units each having an identification (ID) code stored therein and constructed and arranged to communicate information on any of the communication channels, a method for any of the plurality of subscribers receiving a current message on a current communication channel to respond to a priority message on another communication channel comprising the steps of:
   (a) receiving priority data from the central station on the current communication channel;
   (b) determining the priority level of the priority message from said priority data;
   (c) comparing the priority level of the priority message to the priority level of the current message;
   (d) abandoning the current message and responding to the priority message if said priority level of the priority message at least exceeds that of the current message.

2. The method of claim 1, wherein the step of receiving comprises the steps of:
   (a) receiving at least one sub-audible sync word from the central station;
   (b) interrupting, temporarily, the current message to receive at least one audible priority data word.

3. The method of claim 2, which includes the step of receiving an end-of-message code.

4. The method of claim 1, wherein the step of receiving comprises receiving at least one sub-audible priority data word interleaved with a sub-audible connect word.

5. The method of claim 1, wherein said determining step comprises comparing at least a portion of said priority data with priority information representing the priority levels of at least some of the plurality of subscriber units, said priority information being stored in a storage means of the subscriber unit.

6. The method of claim 1, wherein the step of responding comprises returning to a control channel to receive channel assignment information pertaining to the priority message.

7. The method of claim 1, wherein the step of responding comprises receiving the priority message from a selected communication channel identified by said priority data.

8. The method of claim 7, which includes the step of receiving a verification signal on said selected communication channel.

9. The method of claim 1, which includes the step of continuing to receive the current message if said priority level of the priority message is at least less than that of the current message.

10. The method of claim 9, wherein the subscriber continues to receive the current message in said priority levels of the priority message is equal to that of the current message.

11. The method of claim 1, which includes the step of switching, temporarily, the operation of the subscriber unit from a first mode capable of receiving the current message and a sub-audible connect word, to a second mode capable of receiving said priority data.

12. In a trunked communication system for communicating messages of varying priority levels having at least one central station for allocating a limited number of communication channels among a plurality of subscriber units each having an identification (ID) code stored therein and constructed and arranged to communicate information on any of the communication channels, a method for any of the plurality of subscribers receiving a current message on a current communication channel to respond to a priority message on another communication channel comprising the steps of:

(a) receiving at least one sub-audible sync word from the central station on the current communication channel;
(b) interrupting, temporarily, the current message;
(c) receiving priority data from the central station on the current communication channel;
(d) determining the priority level of the priority message from said priority data;
(e) comparing the priority level of the priority message to the priority level of the current message;
(f) abandoning the current message and responding to the priority message if said priority level of the priority message at least exceeds that of the current message.

13. The method of claim 12, which includes the step of receiving at least one end-of-message code after receiving said priority data.

14. The method of claim 12, wherein the step of responding comprises receiving the priority message from a communication channel identified by said priority data.

15. The method of claim 12, which includes the step of remaining on the current communication channel to receive the current message if said priority level of the priority message is less or equal to than that of the current message.

16. In a trunked communication system for communicating messages of varying priority levels having at least one central station for allocating a limited number of communication channels among a plurality of subscriber units each having an identification (ID) code stored therein and constructed and arranged to communicate information on any of the communication channels, a method for any of the plurality of subscribers receiving a current message on a current communication channel to respond to a priority message on another communication channel comprising the steps of:
(a) receiving sub-audible priority data, interleaved with a connect word, from the central station on the current communication channel;
(b) determining the priority level of the priority message from said priority data;
(c) comparing the priority level of the priority message to the priority level of the current message;
(d) abandoning the current message and responding to the priority message if said priority level of the priority message at least exceeds that of the current message.

17. The method of claim 16, wherein the step of responding comprises receiving the priority message from a communication channel identified by said priority data.

18. The method of claim 16, which includes the step of remaining on the current communication channel to receive the current message if said priority level of the priority message is less than or equal to that of the current message.

19. In a trunked communication system for communicating messages of varying priority levels having at least one central station for allocating a limited number of communication channels among a plurality of subscriber units each having an identification (ID) code stored therein and constructed and arranged to communicate information on any of the communication channels, a method for any of the plurality of subscribers receiving a current message on a current communication channel to respond to a priority message on another communication channel comprising the steps of:

(a) receiving at least one sub-audible sync word from the central station on the current communication channel;
(b) interrupting, temporarily, the current message;
(c) receiving priority data from the central station on the current communication channel;
(d) receiving an end-of-message code from the central station on the current communication channel;
(e) determining the priority level of the priority message from said priority data;
(f) comparing the priority level of the priority message to the priority level of the current message;
(g) abandoning the current message and receiving the priority message from a communication channel identified by said priority data if said priority level of the priority message at least exceeds that of the current message;
(h) remaining on the current communication channel if said priority level of the priority message is at least less than that of the current message.

20. In a trunked communication system for communicating messages of varying priority levels having at least one central station for allocating a limited number of communication channels among a plurality of subscriber units each having an identification (ID) code stored therein and constructed and arranged to communicate information on any of the communication channels, a method for any of the plurality of subscribers receiving a current message on a current communication channel to respond to a priority message on another communication channel comprising the steps of:
(a) receiving at least one sub-audible priority data word, interleaved with a connect word, from the central station on the current communication channel;
(b) determining the priority level of the priority message from priority data;
(c) comparing the priority level of the priority message to the priority level of the current message;
(d) abandoning the current message and receiving the priority message if said priority level of the priority message at least exceeds that of the current message;
(e) remaining on the current communication channel if said priority level of the priority message is at least less than that of the current message.

21. In a trunked communication system for communicating messages of varying priority levels having at least one central station for allocating a limited number of communication channels among a plurality of subscriber units each having an identification (ID) code stored therein and constructed and arranged to communicate information on any of the communication channels, a method for the central station to alert the plurality of subscribers receiving a current message on a current communication channel of a priority message on another communication channel comprising the steps of:
(a) receiving a channel request from a subscriber on a control channel;
(b) generating priority data from said channel request;
(c) transmitting said priority data on each of the currently allocated communication channels;
(d) transmitting a channel grant on said control channel.

22. The method of claim 21, wherein the step of transmitting said priority data comprises the steps of:

(a) transmitting at least one sub-audible sync word on the currently allocated communication channels;
(b) transmitting at least said priority data on said currently allocated communication channels.

23. The method of claim 22, which includes the step of transmitting at least one end-of-message code on the currently allocated communication channels.

24. The method of claim 21, wherein the step of transmitting comprises the step of transmitting, sub-audibly, said priority data interleaved with a connect word.

25. In a trunked communication system for communicating messages of varying priority levels having at least one central station for allocating a limited number of communication channels among a plurality of subscriber units each having an identification (ID) code stored therein and constructed and arranged to communicate information on any of the communication channels, a method for the central station to alert the plurality of subscribers receiving a current message on a current communication channel of a priority message on another communication channel comprising the steps of:
(a) receiving a channel request from a subscriber on a control channel;
(b) generating priority data from said channel request;
(c) transmitting at least one sub-audible sync word on the currently allocated communication channels;
(d) transmitting at least said priority data on said currently allocated communication channels.
(e) transmitting at least one end-of-message code on each of the currently allocated communication channels;
(f) transmitting a channel grant on said control channel.

26. In a trunked communication system for communicating messages of varying priority levels having at least one central station for allocating a limited number of communication channels among a plurality of subscriber units each having an identification (ID) code stored therein and constructed and arranged to communicate information on any of the communication channels, a method for the central station to alert the plurality of subscribers receiving a current message on a current communication channel of a priority message on another communication channel comprising the steps of:
(a) receiving a channel request from a subscriber on a control channel;
(b) generating priority data from said channel request;
(c) transmitting, sub-audibly, said priority data interleaved with a connect word on each of the currently allocated communication channels;
(d) transmitting a channel grant on said control channel.

27. In a trunked communication system for communicating messages of varying priority levels having at least one central station for allocating a limited number of communication channels among a plurality of subscriber units each having an identification (ID) code stored therein and constructed and arranged to communicate information on any of the communication channels, a method for the central station to alert the plurality of subscribers receiving a current message on a current communication channel of a priority message on another communication channel comprising the steps of:

at any of the idle subscribers:
(a) transmitting a channel request to the central station on a control channel;
(b) receiving a channel grant from the central station on said control channel;
(c) transmitting a priority message on a selected communication channel identified by said channel grant;

at the central station:
(d) receiving said channel request from said control channel;
(e) generating priority data from said channel request;
(f) transmitting at least said priority data to the subscribers on each currently allocated communication channels;
(g) transmitting said channel grant on said control channel;

at each of the currently communicating subscribers:
(h) receiving said priority data from a current communication channel;
(i) determining the priority level of said priority message from said priority data;
(j) comparing the priority level of the priority message to the priority level of the current message;
(k) abandoning the current message and receiving said priority message from a communication channel identified by priority data if said priority level of said priority message at least exceeds that of the current message.

28. The method of claim 27, wherein the step of transmitting said priority data by the central station comprises the steps of:
(a) transmitting at least one sub-audible sync word on the currently allocated communication channels;
(b) transmitting at least said priority data on said currently allocated communication channels.

29. The method of claim 28, wherein the step of receiving by the currently communicating subscribers comprise the steps of:
(a) receiving at least said sub-audible sync word from the central station;
(b) interrupting, temporarily, the current message to receive at least said priority data.

30. The method of claim 29, which includes the step of transmitting, by the central station, and receiving, by each of the currently communicating subscribers, at least one end-of-message code on the currently allocated communication channels.

31. The method of claim 27, wherein the step of transmitting, by the central station, said priority data comprises the step of transmitting, sub-audibly, said priority data interleaved with a connect word.

32. The method of claim 31, wherein the step of receiving, by the currently communicating subscribers, said priority data comprises the step of receiving, sub-audibly, said priority data interleaved with said connect word.

33. The method of claim 27, which includes the step, but the currently communicating subscribers, of continuing to receive the current message at said priority level if the priority message is at least less than that of the current message.

34. In a trunked communication system for communicating messages of varying priority levels having at least one central station for allocating a limited number of communication channels among a plurality of subscriber units each having an identification (ID) code stored therein and constructed and arranged to communicate information on any of the communication channels, a method for the central station to alert the plurality of subscribers receiving a current message on a current communication channel of a priority message on another communication channel comprising the steps of:

at any of the idle subscribers:
- (a) transmitting a channel request to the central station on a control channel;
- (b) receiving a channel grant from the central station on said control channel;
- (c) transmitting a priority message on a selected communication channel identified by said channel grant;

at the central station:
- (d) receiving said channel request from said control channel;
- (e) generating priority data from said channel request;
- (f) transmitting at least one sub-audible sync word to the subscribers on each currently allocated communication channels;
- (g) transmitting at least said priority data on said currently allocated communication channels;
- (h) transmitting at least one end-of-message code on said currently allocated communication channels;
- (i) transmitting said channel grant on said control channel;

at each of the currently communicating subscribers:
- (j) receiving said sub-audible sync word from a current communication channel;
- (k) receiving said priority data from said current communication channel;
- (l) receiving said end-of-message code from said current communication channel;
- (m) determining the priority level of said priority message from said priority data;
- (n) comparing the priority level of the priority message to the priority level of the current message;
- (o) abandoning the current message and receiving said priority message from a communication channel identified by priority data if said priority level of said priority message at least exceeds that of the current message;
- (p) remaining on said current communication channel if said priority level of said priority message is at least less than that of said current message.

35. In a trunked communication system for communicating messages of varying priority levels having at least one central station for allocating a limited number of communication channels among a plurality of subscriber units each having an identification (ID) code stored therein and constructed and arranged to communicate information on any of the communication channels, a method for the central station to alert the plurality of subscribers receiving a current message on a current communication channel of a priority message on another communication channel comprising the steps of:

at any of the idle subscribers:
- (a) transmitting a channel request to the central station on a control channel;
- (b) receiving a channel grant from the central station on said control channel;
- (c) transmitting a priority message on a selected communication channel identified by said channel grant;

at the central station:
- (d) receiving said channel request from said control channel;
- (e) generating priority data from said channel request;
- (f) transmitting, sub-audibly, at least said priority data interleaved with a connect word to the subscribers on each currently allocated communication channels;
- (g) transmitting said channel grant on said control channel;

at each of the currently communicating subscribers:
- (h) receiving, sub-audibly, said priority data interleaved with said connect word from a current communication channel;
- (i) determining the priority level of said priority message from said priority data;
- (j) comparing the priority level of the priority message to the priority level of the current message;
- (k) abandoning the current message and receiving said priority message from a communication channel identified by priority data if said priority level of said priority message at least exceeds that of the current message;
- (l) remaining on said current communication channel if said priority level of said priority message is at least less than that of said current message.

* * * * *

UNITED STATES PATENT AND TRADEMARK OFFICE
CERTIFICATE OF CORRECTION

PATENT NO. : 4,716,407
DATED : December 29, 1987
INVENTOR(S) : Jaime Borras et al.

It is certified that error appears in the above-identified patent and that said Letters Patent is hereby corrected as shown below:

Column 13, line 66, "subscribers" should be --subscriber--.

Column 18, line 60, "but" should be --by--.

Signed and Sealed this

Twenty-eighth Day of June, 1988

Attest:

DONALD J. QUIGG

*Attesting Officer*  *Commissioner of Patents and Trademarks*